Feb. 24, 1959     L. A. CHABOT ET AL     2,874,407
LATEX SLAB MAKING APPARATUS
Filed Nov. 25, 1955
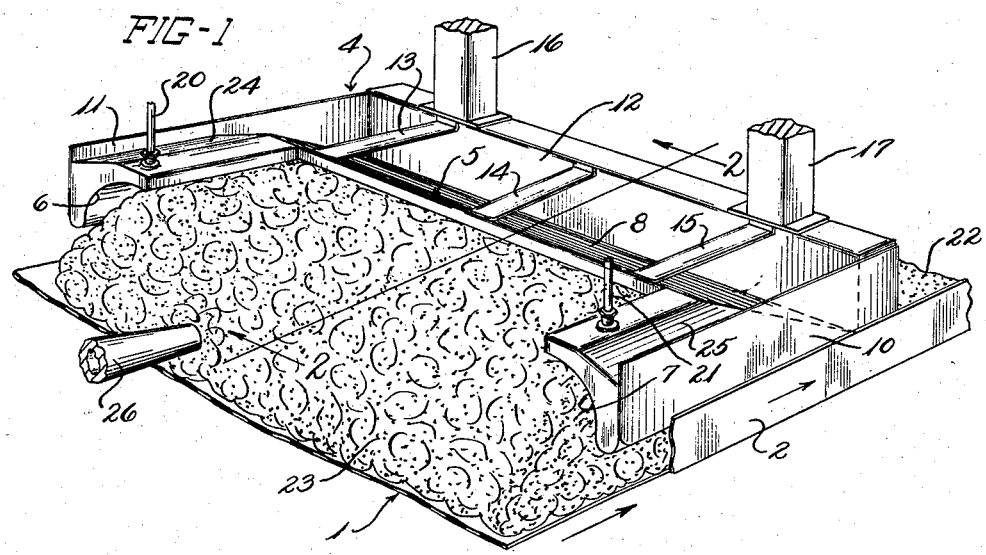
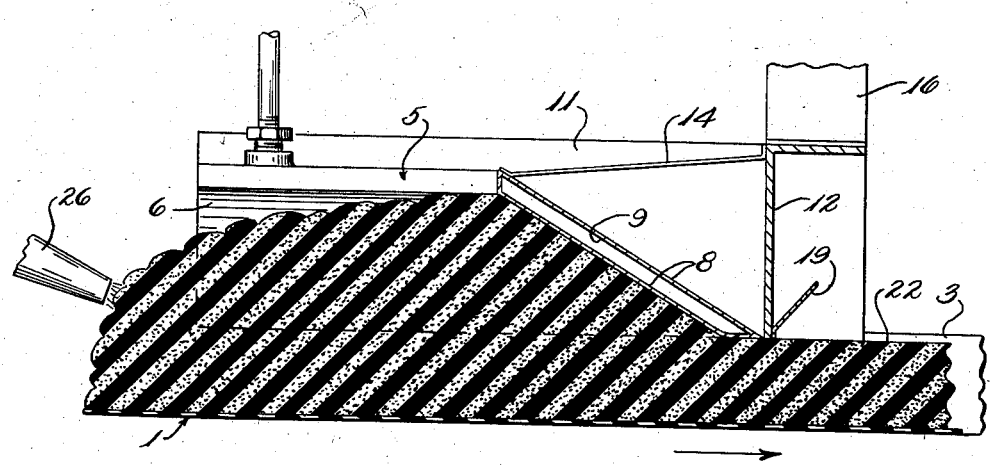
INVENTORS
LEO A. CHABOT
BERTRAND J. DURAND
BY
W. A. Fraser
ATTY.

2,874,407

LATEX SLAB MAKING APPARATUS

Leo A. Chabot, Fall River, and Bertrand J. Durand, Somerset, Mass., assignors to The Firestone Tire & Rubber Company, Akron, Ohio, a corporation of Ohio Application November 25, 1955, Serial No. 549,015

1 Claim. (Cl. 18—4)

This invention relates to means for forming a continuous strip of foamed resilient material of uniform thickness and more particularly to an improved scraper for forming a foamed rubber slab of uniform thickness on a moving belt.

Continuous foam rubber slabs of uniform thickness are conventionally formed by depositing aerated foamed latex on a continuous conveyor belt, passing the foam under the edge of a scraping blade set at a predetermined distance from the belt and normal to the plane thereof, gelling the foam to permanent shape and vulcanizing the slab to a condition of high strength and resilience.

A difficulty of the prior method of forming such slabs has been the formation of gelled particles against the edges of the scraper blades caused by mechanical action of the blade on the foam and by heat radiated from such surrounding elements as hot air ovens, infra red lamps and electronic driers. Periodically the lower edge of such a blade must be scraped to remove the gelled particles so that the surface of the foamed latex slab will not be deformed by small chunks of gelled latex. For this reason, the conventional apparatus for preparing continuous slabs of foamed latex have been unsatisfactory.

The present invention overcomes the difficulties of the prior art by providing a cooled scraper which holds the temperature of the latex foam in the bank of the feed side thereof well below the bulk foam temperature of the latex thus extending the normal gel time. In one modification of the invention, the cooled scraper is held at an angle to the conveyor belt to produce a uniform slab having a smooth surface.

It is therefore an object of the invention to provide means for manufacturing continuous lengths of latex slabs having uniform thickness and smooth surfaces. A further object of the invention is to provide a scraper for preparing the surface of latex slab with means for maintaining the scraper at a temperature lower than the gelling temperature of the latex. Yet another object of the invention is to provide a scraper having a chamber for circulation of cooling fluid and arranged at an angle to the path of travel of foamed latex passed thereunder. A further object of the invention is to provide a method of manufacturing a uniform slab by subjecting the foamed latex to a cooling treatment before it is scraped to uniform thickness on a traveling belt.

These and other objects of the invention will be more easily understood with reference to the specification, claim and drawings of which:

Figure 1 is a perspective view showing the scraper of the invention in relation to foamed latex deposited on a traveling conveyor belt.

Figure 2 is a view in section taken along lines 2—2 of Figure 1.

Referring to Figure 1, an endless conveyor belt indicated at 1 cooperates with traveling side belts 2 and 3 to carry foamed latex from bank 23 beneath the lower edge of a scraper generally indicated at 4 to form a smooth surfaced slab 22 of uniform thickness.

The scraper 4 is comprised of a U-shaped member 5 of metal, plastic, or the like, internally provided with a chamber 9 throughout its extent adapted for the circulation of cooling fluids. The member 5 has arched walls 6 and 7 which merge into the base wall 8 which is slanted with reference to belt 1.

Part of the top surfaces 24 and 25 of the scraper arms and the plate 8 are sloped outwardly and with side plates 10 and 11 and back plate 12 form a trough to catch condensate formed from the atmosphere formed on the cooled scraper. A second trap for condensate is provided on the lower back edge of back plate 12 by the channel formed by flange 19 abutted by side plates 10 and 11. The aforementioned trough and channel prevent condensate formed on the scraper from dripping into the foamed latex to cause irreparable damage in the form of blow holes and furrows.

To reduce torque twisting of the scraper when constructed in considerable width bracing straps 13, 14 and 15 join base wall 8 to back plate 12. The entire scraper 4 is mounted above belt 1 by means of posts 16 and 17 which may be adapted for vertical adjustment in any conventional manner.

Provision is made for circulating cooling fluid such as cold water, alcohol, glycerine or the like through inlet 20 and outlet 21 mounted in the top surfaces of the side walls 6 and 7 respectively. The temperature of the device is preferably held in the range of 40 to 60° F. when natural rubber foam latex is being formed into continuous slabs of uniform thickness.

One example of a latex compound satisfactory for use in the invention is as follows, all parts based on 100 parts solid weight of latex:

Deammoniated natural rubber latex (60% solids):

| | Dry weight |
|---|---|
| Rubber solids content | 100.00 |
| Sulfur | 2.00 |
| Antioxidant | 1.00 |
| Zinc diethyldithiocarbamate | .50 |
| Zinc salt of mercaptobenzothiazole | 1.00 |
| Potassium oleate | 2.00 |
| Triethyltrimethylene triamine | 1.00 |

A mixture according to the above formula was prepared adding the pigments to the uncompounded deammoniated latex in a conventional mixer having a vane rotating at about 400 R. P. M. The compounded latex is held at 75 to 80° F. for a period of from 10 to 20 hours and then aerated by passing through a conventional foamer from whence it is fed through nozzle 26 to form bank 23.

Although in the preferred form of the invention, the scraper has been described in use with natural rubber foam, it is to be understood that the device serves equally well in the treatment of synthetic rubber and natural-synthetic rubber blends.

An advantage of the invention lies in the features of the adjustment of the cooled scraper 8 at an angle to the vertical. Angling the scraper eliminates dead spots at the top of the foam bank. Angled scraper 8 presents more surface to the foam bank than does a scraper mounted normal to the plane of belt 1 but since the blade is cooled the increased surface of contact between the foam and the bank prevents the foam from gelling thereby avoiding the difficulty of the prior art. The optimum angle of adjustment of the blade with the horizontal lies between 10 and 45°.

One form of the invention has been shown by way of example but those skilled in the art will realize that modification of the invention is possible within the scope of the following claim:

Apparatus for contouring foamed latex comprising in combination a conveyor belt on one surface of which said latex is carried, two belts parallel to the first conveyor belt at each respective edge thereof having surfaces normal to said one surface of said conveyor belt, a scraping blade mounted transverse said conveyor belt in spaced relation to said one surface and tilted at an angle of 10° to 45°, said scraping device having a base member transverse said conveyor belt and two arm members arcuate in cross section extending from said base member embracing the path of travel of said latex, each arm member having a surface parallel to the path of travel of said latex and in sliding contact with its respective side belt and means in said base and arm members to cool said latex below the gel point thereof, whereby the path of travel of said latex on said conveyor may be converged in response to said arms and said base member to a predetermined configuration without the build up of frictional heat in said latex.

References Cited in the file of this patent

UNITED STATES PATENTS

| | | |
|---|---|---|
| 2,072,597 | Keen et al. | Mar. 2, 1937 |
| 2,161,308 | Murphy et al. | June 6, 1939 |
| 2,324,977 | Bosomworth | July 20, 1943 |
| 2,369,484 | Nadeau | Feb. 13, 1945 |
| 2,404,582 | Bosomworth | July 23, 1946 |
| 2,441,235 | Blair et al. | May 11, 1948 |
| 2,623,239 | Fischbein | Dec. 30, 1952 |
| 2,712,154 | Lindquist | July 5, 1955 |

FOREIGN PATENTS

| | | |
|---|---|---|
| 699,667 | Great Britain | Nov. 11, 1953 |
| 39,915 | Netherlands | Jan. 15, 1937 |